US009231355B2

(12) United States Patent
Chang

(10) Patent No.: US 9,231,355 B2
(45) Date of Patent: Jan. 5, 2016

(54) USB CONNECTOR HAVING SIGNAL PROCESSING IC AND USB CABLE HAVING THE USB CONNECTOR

(71) Applicant: Nai-Chien Chang, New Taipei (TW)

(72) Inventor: Nai-Chien Chang, New Taipei (TW)

(*) Notice: Subject to any disclaimer, the term of this patent is extended or adjusted under 35 U.S.C. 154(b) by 0 days.

(21) Appl. No.: 14/160,782

(22) Filed: Jan. 22, 2014

(65) Prior Publication Data

US 2014/0220825 A1 Aug. 7, 2014

(30) Foreign Application Priority Data

Feb. 7, 2013 (TW) .............................. 102202859 U

(51) Int. Cl.
*H01R 13/66* (2006.01)
*H01R 24/76* (2011.01)
*G06F 21/85* (2013.01)

(52) U.S. Cl.
CPC ................ *H01R 24/76* (2013.01); *G06F 21/85* (2013.01)

(58) Field of Classification Search
CPC ........... H01R 13/6658; H01R 23/6873; H01R 13/7195; H01R 23/025
USPC ........ 439/76.1, 607.35, 607.4, 620.1–620.12, 439/620.15–620.19, 660, 946
See application file for complete search history.

(56) References Cited

U.S. PATENT DOCUMENTS

| 6,246,578 | B1 * | 6/2001 | Wei et al. ................... 361/679.4 |
| 6,283,789 | B1 * | 9/2001 | Tsai .............................. 439/502 |
| 7,249,978 | B1 * | 7/2007 | Ni ................................. 439/660 |
| 7,359,208 | B2 * | 4/2008 | Ni ................................. 361/752 |
| 7,407,390 | B1 * | 8/2008 | Ni ................................ 439/76.1 |
| 7,740,490 | B1 * | 6/2010 | Chang ......................... 439/76.1 |
| 7,798,853 | B2 * | 9/2010 | Shi et al. ................. 439/607.58 |
| 7,815,469 | B1 * | 10/2010 | Nguyen et al. .......... 439/607.35 |
| 7,833,056 | B1 * | 11/2010 | Lee et al. ................. 439/607.23 |
| 8,235,746 | B2 * | 8/2012 | He ................................ 439/502 |

* cited by examiner

*Primary Examiner* — Thanh Tam Le
(74) *Attorney, Agent, or Firm* — Chun-Ming Shih; HDLS IPR Services

(57) ABSTRACT

A USB cable includes two USB connectors and a plurality of cable lines. Each USB connector includes a circuit board, a tongue board, a plurality of connection terminals, a signal processing IC, an isolated housing and a metal housing. The tongue board is connected with the circuit board. One end of the connection terminals are connected to the circuit board, and the other end of the connection terminals are set in the tongue board. The signal processing IC is electrically connected to the circuit board and further connected to the connection terminals. The isolated housing encapsulates the circuit board and the signal processing IC. The metal housing encapsulates the tongue board and the connection terminals. The signal processing IC encrypts data for transmitting externally through the connection terminals, and decrypts data received by the connection terminals to transmit to other end of the USB cable to be used.

8 Claims, 5 Drawing Sheets

USB CONNECTOR HAVING SIGNAL PROCESSING IC AND USB CABLE HAVING THE USB CONNECTOR

BACKGROUND OF THE INVENTION

1. Field of the Invention

The present invention relates to a USB connector, and in particular to a USB connector having a signal processing IC and a USB cable having the USB connector.

2. Description of Prior Art

These years, universal serial bus (USB) connector is very popular, almost every electronic device in the market is arranged at least one USB connector. The USB connector has the function of plug and play. Furthermore, because of the special pin define of the USB connector (Vcc, D−, D+, GND), an electronic device arranged the USB connector can use the USB connector to transmit power directly, very convenient.

However, the convenience of the USB connector brings the security problems of information. Because almost every electronic device is arranged at least one USB connector thereon, a third party can easily steal digital data from, or broadcast virus to a USB connector arranged electronic device, through a simple USB cable or a USB flash disk (UFD). For salving this security problem, a new USB device is demanded in the market that can encrypt data before outputting, and decrypt data after receiving.

Further, the standard USB connector now in the market can provide 5V/500 mA output (which is power 2.5 W), it is enough to satisfy most electronic devices, such as mobile phone, human machine interface (HMI), 2.5-inch hard disk drive (HDD) to charge or to work. However, 5V/500 mA output still not enough for some electronic device which needs higher power to work, such as 3.5-inch HDD or laptop computer.

Actually, the standard USB connector can provide outputted power higher than 2.5 W. However, the USB connector has the function of plug and play mentioned above, and user used to pull out a USB device from the USB connector during usage, if the USB connector provides outputted power higher than 2.5 W without any detection means, it may cause the USB device, the USB connector or the electronic device arranged the USB connector to be burned while the USB connector is pulled out.

SUMMARY OF THE INVENTION

The present invention is to provide a USB connector having a signal processing IC, and a USB cable having the USB connector, wherein the USB connector encrypts data before the data is transmitted, and decrypts data after the data is received through the signal processing IC. Therefore, a protection is provided for the transmitted data, files, signal and command.

The present invention further provide a USB connector having a signal processing IC, and a USB cable having the USB connector, when the USB connector inserts into a female connector which can support high power transmission, it triggers the female connector to provide specific power output which is higher than that of standard power.

A USB cable mentioned above includes two USB connectors and a plurality of cable lines. Each of the two USB connectors include a circuit board, a tongue board, a plurality of connection terminals, a signal processing IC, an isolated housing and a metal housing. The tongue board is connected with the circuit board. One end of the plurality of connection terminals are connected to the circuit board, and the other end of the plurality of connection terminals are set in the tongue board. The signal processing IC is electrically connected to the circuit board, and electrically connected to the connection terminals through the circuit board. The isolated housing encapsulates the circuit board and the signal processing IC. The metal housing encapsulates the tongue board and the connection terminals. The signal processing IC encrypts data for transmitting externally through the connection terminals, and decrypts data received by the connection terminals to transmit to other end of the USB cable to be used.

In comparing with prior art, the present invention can transmit data before/after the data being encrypted/decrypted through the signal processing IC of the USB connector of the USB cable. Therefore, user can use the USB cable of this invention directly to transmit data which is needed to be encrypted. The encrypted data can be decrypted by an IC in an electronic device receiving the encrypted data. Else, when the data is encrypted, user can only successfully receive and decrypt the encrypted data by using the corresponding USB connector, so the security of data transmission is enhanced.

Also, a longer metal housing is arranged on the USB connector, and the USB connector can trigger a female USB connector which can support high power transmission to provide specific power output which is higher than standard power when inserting into the female USB connector. Therefore, the charging action of an electronic device connected with the USB connector is speeded up, also, the USB cable can be used to support a kind of electronic devices which needs higher power to work.

DETAILED DESCRIPTION OF THE INVENTION

In cooperation with attached drawings, the technical contents and detailed description of the present invention are described thereinafter according to a preferable embodiment, being not used to limit its executing scope. Any equivalent variation and modification made according to appended claims is all covered by the claims claimed by the present invention.

Figure 1:
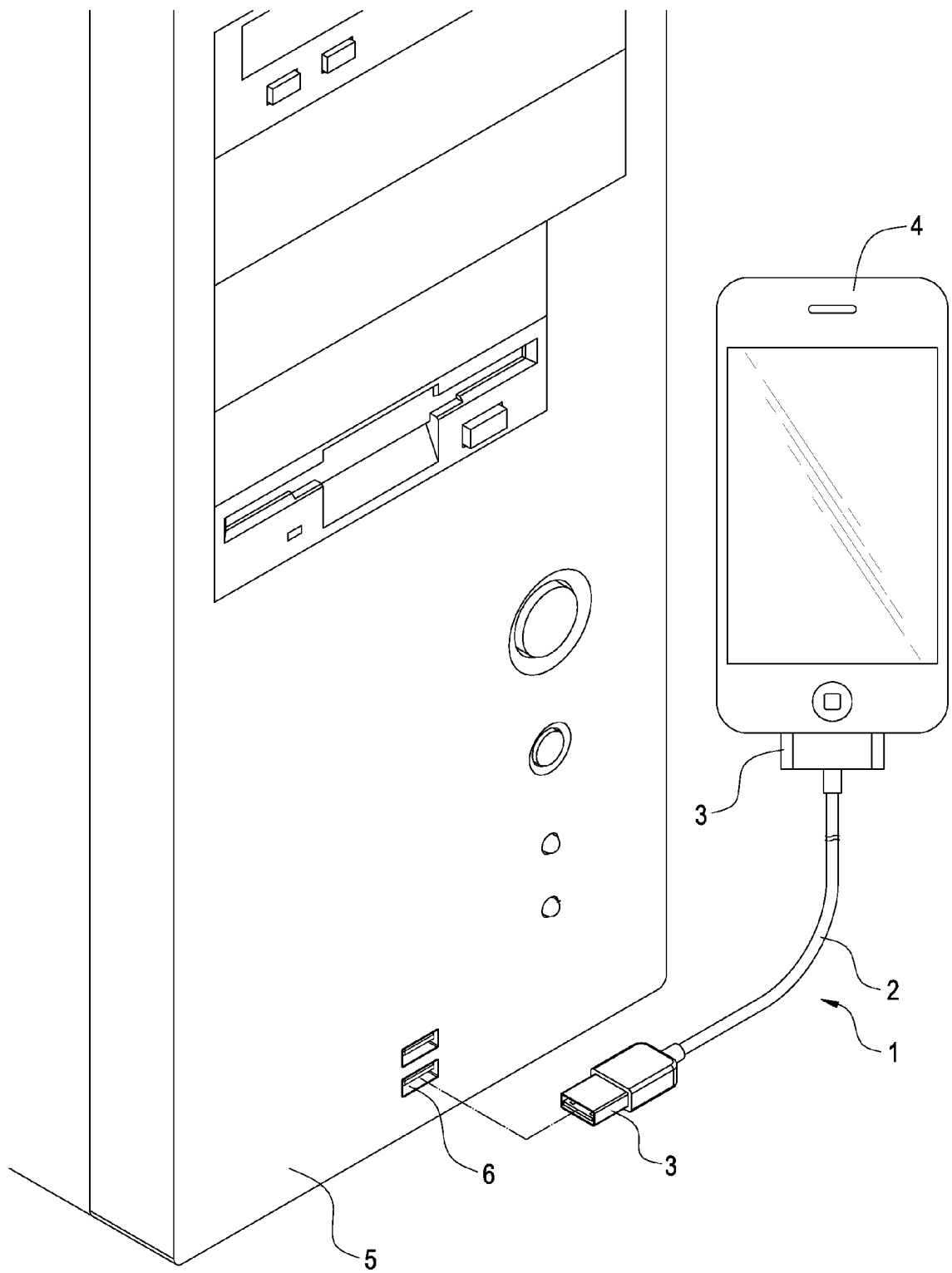
FIG. 1 is a perspective view showing usage of a first embodiment according to the present invention.

FIG. 1 is a perspective view showing usage of a first embodiment according to the present invention. The present invention discloses a universal serial bus (USB) cable 1, the USB cable 1 includes a plurality of cable lines 2 and two USB connectors 3, wherein, one of the two USB connectors 3 is connected to one end of each cable line 2, and the another one of the two USB connectors 3 is connected to another end of each cable line 2. More particularly, at least one of the two USB connectors 3 is embedded a signal processing integrated circuit (IC), or, both of the USB connectors are embedded the signal processing IC, however, it is not intended to limit the scope of the present invention.

The two USB connectors 3 of the USB cable 1 are used to connect with two electronic devices separately, and the two electronic devices in FIG. 1 is depicted as a mobile device 4 and a personal computer 5 for instance, but not intended to limit the scope of this present invention. When connecting with the personal computer 5 through the USB cable 1, the mobile device 4 can transmit data to the personal computer 5, receive data from the personal computer 5, and further receive power outputted and provided by the personal computer 5. As shown in FIG. 1, the personal computer 5 outputs power and provides the power to the mobile device 4 through a female connector 6 thereon. In particularly, if the mobile device 4 is a kind of device which needs only small power to work, for example, a USB flash disk (UFD) or a 2.5-inch hard disk drive (HDD), the mobile device 4 can keep working by using the power provided by the personal computer 5 only.

In this embodiment, the personal computer 5 mainly connects with one of the two USB connectors 3 of the USB cable 1 through the female connector 6 thereon, which can support high power output. If the USB connector 3 (one of the two USB connectors 3 for example) in the present invention is a USB type male connector, which can support high power output, it can trigger the female connector 6 for the personal computer 5 to provide a specific power output higher than standard 5V/500 mA power (detailed description below). Therefore, a charging action of the mobile device 4 connected to the other USB connector 3 of the USB cable 1 is speeded. Else, the USB cable 1 can support other kind of device which needs high power to work, for example, a 3.5 inch HDD or a laptop computer.

Figure 2:
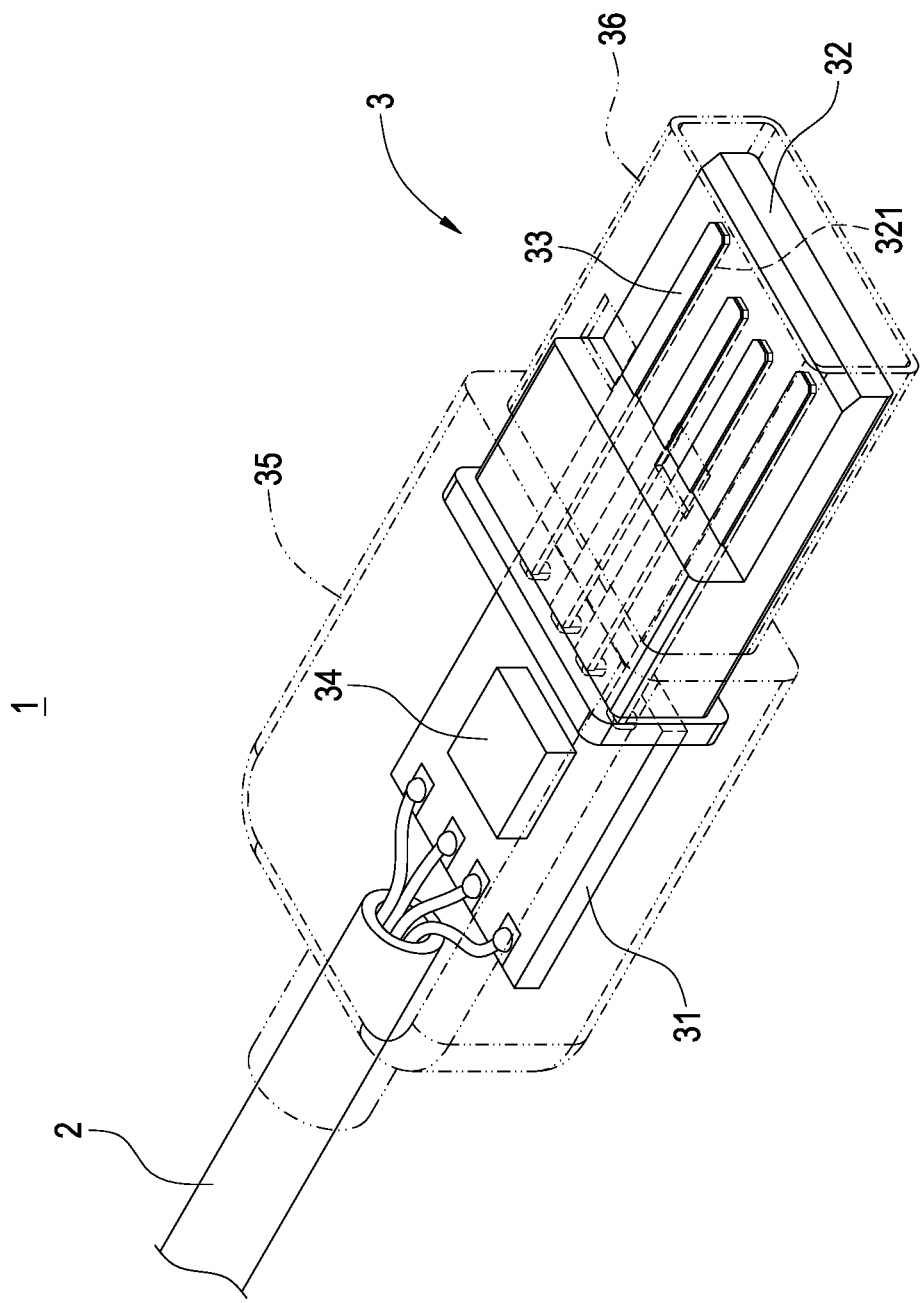
FIG. 2 is a perspective view of a connector of the first embodiment according to the present invention.
Figure 3:
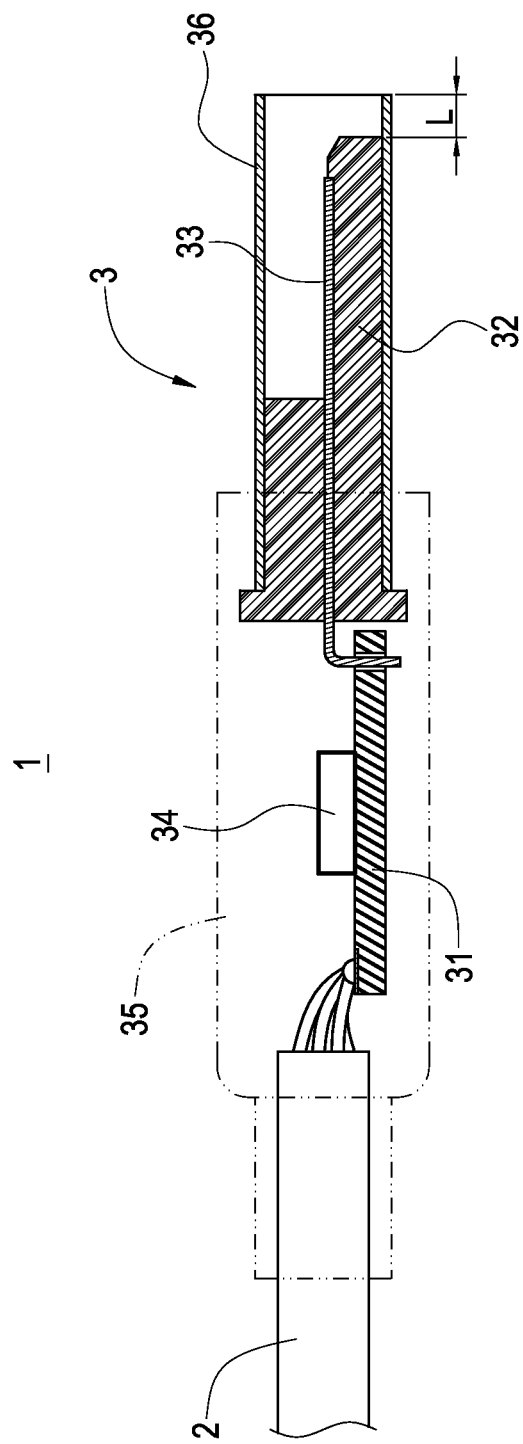
FIG. 3 is a section view of the connector of the first embodiment according to the present invention.

FIG. 2 is a perspective view of the first embodiment according to the present invention. FIG. 3 is a section view of a connector of the first embodiment according to the present invention. As shown in FIG. 2 and FIG. 3, the USB connector 3 (one for example) mainly comprises a circuit board 31, a tongue board 32, a plurality of connection terminals 33 and a signal processing IC 34, and further comprises an insulated housing 35 and a metal housing 36 to encapsulate the above mentioned components.

The circuit board 31 is a board with electronic circuit thereon. The tongue board 32 is constructed by an insulated material, for example, plastic, and is connected to one side of the circuit board 31 by means of sticking, pressing or welding. The tongue board 32 has a plurality of terminal slots 321, the amount of the plurality of terminal slots 321 is according to the amount of the plurality of connection terminals 33. One end of each of the plurality of connection terminals 33 is electrically connected to the circuit board 31 separately, and the other end of each of the plurality of connection terminals 33 is extended to set in the corresponding one of terminal slots 321 of the tongue board 32. The plurality of connection terminals 33 are separately exposed out of the tongue board 32, so when the USB connector 3 is inserted into the female connector 6, the plurality of connection terminals 33 can electrically connect with the terminals in the female connector 6, so as to transmit data and power.

The signal processing IC 34 is electrically connected to the circuit board 31, and electrically connected to the plurality of connection terminals 33 through the circuit board 31. If external data received by the plurality of connection terminals 33 are encrypted, the USB connector 3 uses the signal processing IC 34 to decrypt the received, encrypted data, and then transmits the decrypted data to the other end of the USB cable 1 to use.

For instance, if the USB cable 1 connects to the mobile device 4 and the personal computer 5 at the same time, and receives encrypted data from the personal computer 5 by the USB connector 3, then the USB connector 3 can decrypts the encrypted data via the signal processing IC 34, and then transmits the decrypted data to the mobile device 4 to use. In the other hand, when the mobile device 4 uses the USB cable 1 to transmit data, then the USB connector 3 of the USB cable 1 can encrypt data via the signal processing IC 34 in advance, and then transmits the encrypted data to the personal computer 5 through the plurality of connection terminals 33.

It should be mentioned that the encryption/decryption function described above can be replaced with a specific format transformation. For example, data can be transformed into the specific format by an encrypted IC arranged on the personal computer 5 (or arranged on the female connector 6 of the personal computer 5), and then be recovered back to the original format by the signal processing IC 34 of the USB connector 3 during transmission. Therefore, the mobile device 4 can read and process the recovered data successfully after receiving the recovered data from the USB cable 1. In other example, the USB cable 1 can transform data into the specific format by the signal processing IC 34 of the USB connector 3 before transmitting to the personal computer 5, and the transformed data can be recovered back to the original format by a decrypting IC arranged on the personal computer 5 (or arranged on the female connector 6 of the personal computer 5), so as to be read by the personal computer 5.

As mentioned above, if the encrypting IC/decrypting IC is arranged on a motherboard of the personal computer 5, user can sale the USB cable 1(or the USB connector 3) of the present invention with the encrypting IC/decrypting IC (or the personal computer 5) in a set. Furthermore, the encrypting IC/decrypting IC can also be arranged on the female connector 6, so user can sale the USB cable 1(or the USB connector 3) of the present invention with the female connector 6 in a set. Therefore, it is helpful to promote the present invention into the market.

The insulated housing 35 is used to encapsulate the circuit board 31 and the signal processing IC 34. The metal housing 36 is connected to one side of the insulated housing 35 by means of sticking, pressing or welding, and the metal housing 36 is used to encapsulate the tongue board 32 and the plurality of connection terminals 33.

The metal housing and the tongue board of a standard USB type male connector have the same or the similar length, it is to say, when the metal housing encapsulates the tongue board, the leading edge of the metal housing and the leading edge of the tongue board are aligned. However, the USB connector 3 in the present invention is the kind of connector which can support high power output, and the length of the metal housing 36 is longer than that of the tongue board 32. As shown in FIG. 3, there exists a distance between the leading edge of the metal housing 36 and the leading edge of the tongue board 32, and in this embodiment, the length of the distance is L.

In this embodiment, the length of the distance L between the leading edge of the tongue board 32 and the leading edge of the metal housing 36 is longer than 1.3 mm. In other embodiment, the length of the distance L is between 1.3 mm to 1.6 mm. In another embodiment, the length of the distance L is 1.4 mm. However, the above descriptions are just few embodiments, not intended to limit the scope of the present invention.

Figure 4:
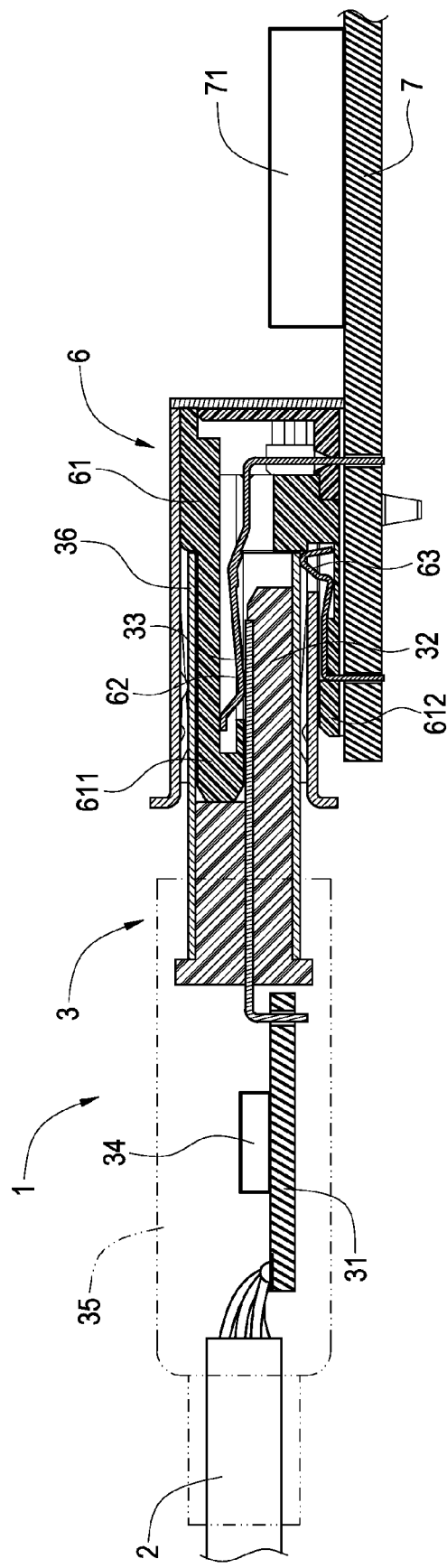
FIG. 4 is a perspective view showing insertion of the connector of the first embodiment according to the present invention.

FIG. 4 is a perspective view showing insertion of the connector of the first embodiment according to the present invention. As shown above, the USB connector 3 is the kind of USB type male connector which can support high power output, and the female connector 6 is the kind of USB type female connector which can support high power output.

The female connector 6 mainly includes an insulated body 61, a plurality of conductive terminals 62, and at least one detection terminal 63. The insulated body 61 has a tongue portion 611 extended frontward from the top side of the insulated body 61, and has a protruding portion 612 extended frontward from the bottom side of the insulated body 61, wherein the length of the protruding portion 612 is shorter than that of the tongue porting 611. The plurality of conductive terminals 62 are set in the tongue portion 611. One end of each of plurality of conductive terminals 62 is exposed out of the tongue portion 611 separately, so the plurality of conductive terminals 62 can be electrically connected with the plurality of connection terminals 33 of the USB connector 3 which is inserted into the female connector 6. The other end of each of the plurality of conductive terminals 62 is bended downward and extended out of the bottom side of the insulated body 61. The female connector 6 is electrically connected with a motherboard 7 (for example, the motherboard of the personal computer 5), and the motherboard 7 transmits data and power through the female connector 6 and the USB connector 3.

The detection terminal 63 is set in the protruding portion 612. One end of the detection terminal 63 is exposed out of the protruding portion 612 separately. The other end of the detection terminal 63 is bended and extended out of the bottom side of the insulated body 61, so as to connect with the motherboard 7 electrically. A power controlling IC 71 is arranged on the motherboard 7, and the power controlling IC 71 is electrically connected with the plurality of detection terminal 63 of the female connector 6 through the motherboard 7. When the USB connector 3 is inserted into the female connector 6, the power controlling IC 71 determines whether the USB connector 3 is a standard USB connector or a connector which can support high power output, by determining if the detection terminal 63 is triggered or not.

In particularly, the depth of the high-power supporting female connector 6 is deeper than that of a standard USB type female connector, and the detection terminal 63 is set at a rear edge of the protruding portion 612. As the reason, when a standard USB type male connector is inserted into the female connector 6, the standard USB type male connector can't trigger the detection terminal 63 set at the rear edge of the protruding portion 612 of the female connector 6. Therefore, the female connector 6 only outputs standard 5V/500 mA power.

As shown in FIG. 4, the USB connector 3 in the present invention is the kind of connector which can support high power output, and the metal housing 36 of the USB connector 3 is longer than that of a standard USB type male connector. It is to say, when the USB connector 3 is inserted into the female connector 6, the longer metal housing 36 thereon can touch and trigger the detection terminal 63 of the female connector 6. If the detection terminal 63 is triggered, the power controlling IC 71 can determine that the USB connector 3 can support high power output. Therefore, the power controlling IC 71 controls the female connector 6 to output a specific voltage/current which is higher than the standard voltage/current.

It should be mentioned that the USB cable 1 having the USB connector 3 and the mobile device 4 connected with the USB cable 1 in this embodiment should all support high power output. For example, the plurality of cable lines 2 of the USB cable 1 should be constructed by thick material, for the ability of sustaining high voltage/current. Else, the mobile device 4 should be embedded with a high efficiency power process module (not shown), for the ability of receiving and processing high power. Otherwise, when the female connector 6 outputs the specific power higher than the standard power, the USB cable 1 and/or the mobile device 4 will have the high possibility of burning down.

Figure 5:
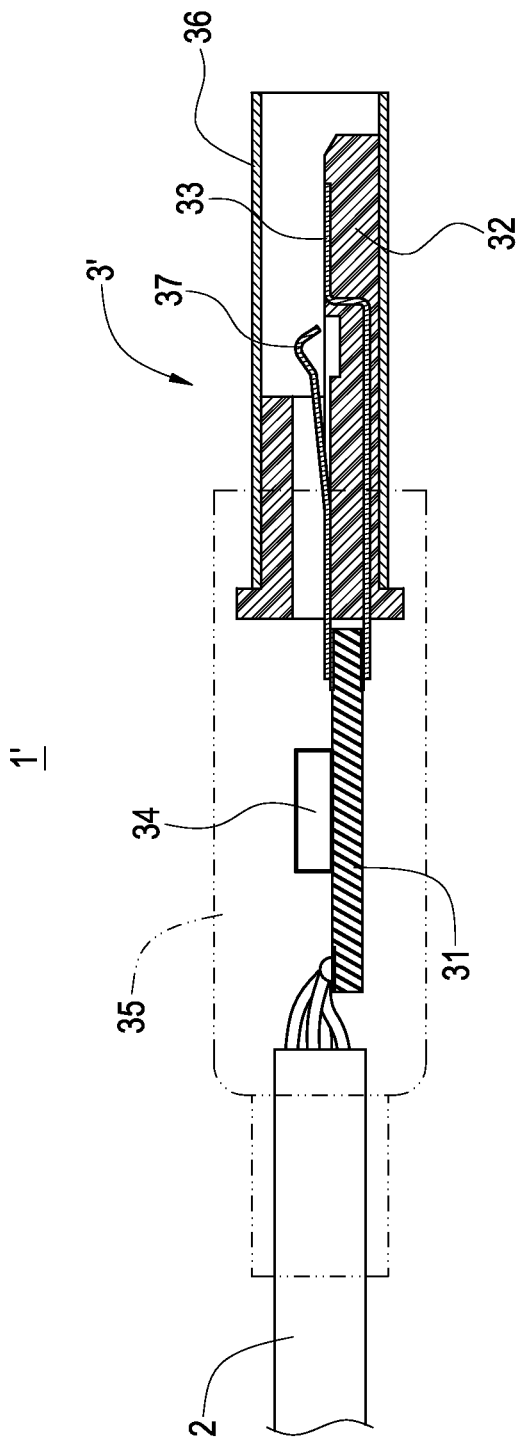
FIG. 5 is a section view of the connector of a second embodiment according to the present invention.

FIG. 5 is a perspective view of the connector of a second embodiment according to the present invention. In FIG. 2 to FIG. 4, the USB connector 3 is depicted as a USB2.0 type connector for example, the amount of the plurality of terminal slots 321 is four, the amount of the plurality of connection terminals 33 is four, and the plurality of cable lines 2 of the USB cable 1 is four, too. In this embodiment, however, another USB cable 1' is disclosed. The USB cable 1' has two ends, and each of the two ends is electrically connected to USB connectors 3' thereof, wherein the USB connector 3' in this embodiment is depicted as a USB3.0 type connector.

The difference between the USB connector 3' and the USB connector 3 is that the USB connector 3' further comprises a plurality of second connection terminals 37. One end of each of the plurality of second connection terminals 37 is electrically connected to the circuit board 31. The other end of each of the plurality of second connection terminals 37 is respectively extended to set in the corresponding one of terminal slots 321 of the tongue board 32, and exposed out of the terminals slots 321. In this embodiment, the amount of the plurality of terminal slots 321 of the USB connector 3' is nine, the amount of the plurality of second connection terminals 37 of the USB connector 3' is five, and the plurality of connection terminals 33 is still four. The plurality of second connection terminals 37 are arranged in the rear of the plurality of connection terminals 33. The total amount of the plurality of connection terminals 37 and second connection terminals 33 of the USB connector 3' is nine, so as to consist a USB3.0 type transmission interface.

In the first embodiment of the present invention, the USB cable 1 is constructed by the plurality of cable lines 2 and two USB connectors 3. Each of the two USB connectors 3 is arranged at each end of the plurality of cable lines 2. Both of the USB connectors 3 are USB2.0 type connector, and the amount of the plurality of cable lines is four. In the second embodiment of the present embodiment, the USB cable 1' is constructed by the plurality of cable lines 2 and two USB connectors 3'. Each of the two USB connectors 3' is arranged at each end of the plurality of cable lines 2. Both of the USB connectors 3' are USB3.0 type connector, and the plurality of cable lines 2 is nine.

Although the present invention has been described with reference to the foregoing preferred embodiments, it will be understood that the invention is not limited to the description thereof. Any equivalent variations and modifications can be made to those skilled in the art in view of the teaching of the present invention are also in the scope of the invention as defined in the appended claims.

What is claimed is:

1. A USB connector, includes:
    a circuit board having a longitudinal surface and a vertical surface;
    a tongue board connected to the vertical surface of the circuit board by sticking, pressing or welding and having a plurality of terminal slots;
    a plurality of connection terminals, one end of each connection terminal electrically connected to the circuit board, the other end of each connection terminal being set in a corresponding terminal slot of the tongue board, and exposed out of the tongue board;
    a signal processing IC, electrically connected to the circuit board, and electrically connected to the plurality of connection terminals through the circuit board, the signal processing IC encrypting transmission data in an original format to an encrypted data in a specific format and transmitting the encrypted data through the plurality of connection terminals, and the signal processing IC decrypting the encrypted data in the specific format received by the plurality of connection terminals to the original format;

an insulated housing, encapsulating the circuit board and the signal processing IC; and a metal housing, connected with the insulated housing and encapsulating the tongue board and the plurality of connection terminals.

2. The USB connector according to claim 1, wherein a length of the metal housing is longer than a length of the tongue board.

3. The USB connector according to claim 2, wherein a distance between a leading edge of the tongue board and a leading edge of the metal housing is longer than 1.3 mm.

4. The USB connector according to claim 3, wherein the distance between the leading edge of the tongue and the leading edge of the metal housing is between 1.35 mm to 1.6 mm.

5. The USB connector according to claim 4, wherein the distance between the leading edge of the tongue and the leading edge of the metal housing is 1.4 mm.

6. The USB connector of claim 3, wherein an amount of the plurality of terminal slots is four, an amount of the plurality of connection terminals is four, and the USB connector is a USB2.0 type male connector.

7. A USB cable having the USB connector of claim 3, further comprising two USB connectors and a plurality of cable lines, one end of each of the cable lines electrically connected one of the two USB connectors, and the other end of each of the cable lines electrically connected to the other one of the two USB connectors.

8. The USB cable according to claim 7, wherein the two USB connectors are USB2.0 type male connector, and an amount of the plurality of cable lines is four.

* * * * *